United States Patent [19]

Jang

[11] Patent Number: 5,115,322
[45] Date of Patent: May 19, 1992

[54] GUIDING MECHANISM FOR A FACSIMILE FOR PREVENTING JAM OF HEAT-SENSITIVE RECORDING PAPER

[75] Inventor: Dug-Hwan Jang, Suwon, Rep. of Korea

[73] Assignee: SamSung Electronics Co., Ltd., Suwon, Rep. of Korea

[21] Appl. No.: 450,086

[22] Filed: Dec. 13, 1989

[30] Foreign Application Priority Data

Jun. 30, 1989 [KR] Rep. of Korea ............... 9318/1989

[51] Int. Cl.5 .................. B41J 2/32; B41J 11/70; B41J 15/04; B65H 35/06; B65H 29/70
[52] U.S. Cl. ........................... 358/304; 346/76 PH; 346/24; 400/621; 271/188
[58] Field of Search ........... 358/296, 304; 271/209, 271/188; 400/619, 621; 346/76 PH, 24; 355/310, 28-29, 321

[56] References Cited

U.S. PATENT DOCUMENTS

| | | | |
|---|---|---|---|
| 4,005,257 | 1/1977 | Krallinger et al. | 358/304 |
| 4,115,817 | 9/1978 | Suzuki et al. | 358/304 |
| 4,361,319 | 11/1982 | Ikeda et al. | 271/209 |
| 4,720,728 | 1/1988 | Kando | 271/209 |
| 4,975,781 | 12/1990 | Hirose | 358/304 |

OTHER PUBLICATIONS

IBM Technical Disclosure Bulletin vol. 20, No. 5 Oct. 1977 "Collator Bin".

*Primary Examiner*—Benjamin R. Fuller
*Assistant Examiner*—Scott A. Rogers
*Attorney, Agent, or Firm*—Robert E. Bushnell

[57] ABSTRACT

In order to prevent jam of the heat-sensitive recording paper in a facsimile, there is disclosed a guiding mechanism comprising a plurality of elongated ridges formed on the guiding surface so as to considerably reduce the contacting surface between the guiding surface and the recording paper, and a pivot for pivotally connecting a guiding element to another guiding element.

5 Claims, 2 Drawing Sheets

GUIDING MECHANISM FOR A FACSIMILE FOR PREVENTING JAM OF HEAT-SENSITIVE RECORDING PAPER

BACKGROUND OF THE INVENTION

The present invention generally concerns a guiding mechanism for a facsimile, for preventing jam of the heat-sensitive recording paper Generally, a facsimile comprises a heat-sensitive recording element for recording received data on heat-sensitive recording paper, a receiving roll for conveying the heat-sensitive recording paper, the receiving roll being arranged below the heat-sensitive recording element, an intermediate guiding unit arranged behind for guiding the heat-sensitive recording paper passing the receiving roll to an automatic cutter to cut the recording paper behind the guiding unit, a final guide for guiding pieces of the recording paper cut by the cutter to a stacker, and a plate for supporting the automatic cutter and final guide.

In such a conventional facsimile, because the final guide has a plane guiding surface, the pieces of the recording paper are always guided by contacting the whole guiding surface of the final guide. Hence, the frictional surface between the final guide and the recording paper, and thus the friction coefficient is so large as to cause jams of the recording paper. Furthermore, when the cutter cuts the recording paper, the intermediate guiding unit moves towards the receiving roll, so that the space between the intermediate guiding unit and the receiving roll must be enlarged. Therefore, the recording paper passing the receiving roll may easily be jammed between the guiding unit and the receiving roll.

SUMMARY OF THE INVENTION

An object of the present invention is therefore to provide a device for reducing the contacting surface between the recording paper and the final guide, and thus reducing the friction coefficient raised therebetween, so as to obviate jams of the recording paper due to moisture.

According to the present invention, a guiding mechanism for preventing jams of the heat-sensitive recording paper comprises a plurality of elongated ridges formed on the guiding surface of the final guide so as to considerably reduce the contacting surface between the guiding surface and the heat-sensitive paper, and a pivot for pivotally connecting on element of the intermediate guiding unit to another element thereof.

BRIEF DESCRIPTION OF THE DRAWINGS

For a better understanding of the invention and to show how the same may be carried into effect, reference will now be made, by way of example, to the accompanying diagrammatic drawings, in which.

DETAILED DESCRIPTION OF THE PREFERRED EMBODIMENTS

The present invention will now be more specifically described with reference to the drawings attached, only by way of example.

Figure 1:
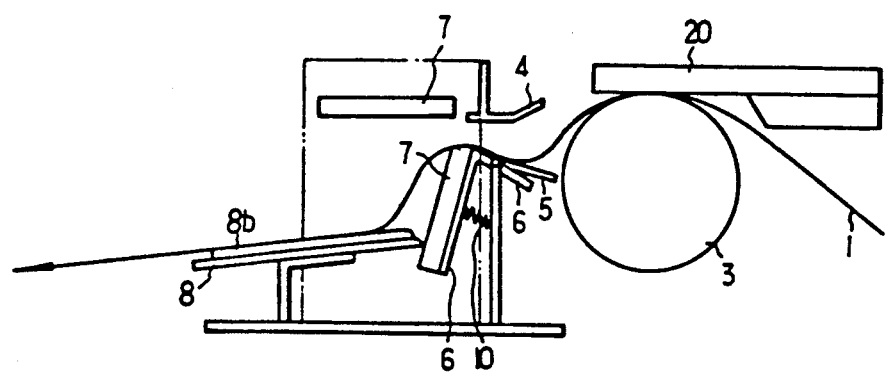
FIG 1 illustrates the structure of a facsimile employing the present invention.
Figure 2:
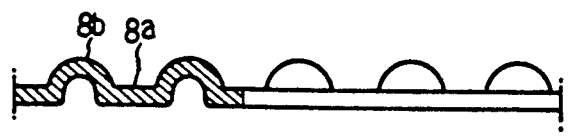
FIG. 2 is a side view for partially illustrating the cross section of the inventive structure.

Referring to FIGS. 1 and 2, heat-sensitive recording element 20, receiving roll 3, intermediate guiding units 4,5, and 6, automatic cutter 7 and final guide 8 are arranged in the direction of conveying heat-sensitive recording paper 1. The inventive guiding mechanism comprises a plurality of elongated ridges 8a, 8b formed on the guiding surface of the final guide 8 so as to considerably reduce the contacting surface between the guiding surface and the heat-sensitive paper, and a pivot for pivotally connecting guiding element 6 to guiding element 5.

Figure 4:
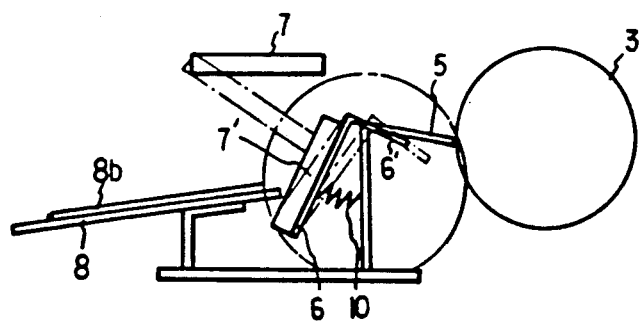
FIG. 4 schematizes the inventive structure for illustrating its operation.
Figure 4:
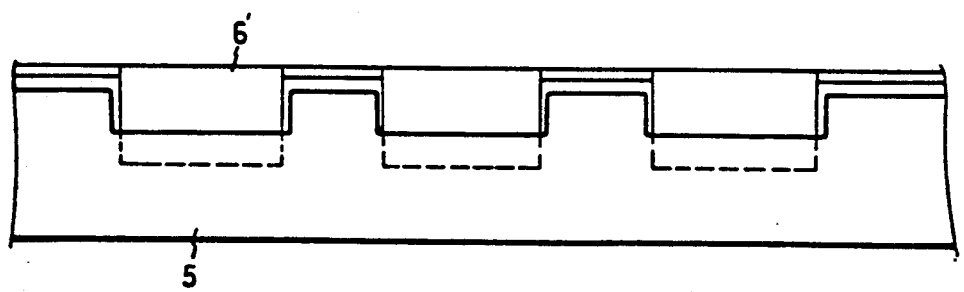

In operation, the heat-sensitive recording element 20 records received data on the heat-sensitive recording paper 1 passing on the receiving roll 3. Then, the recording paper 1 passes through the guiding element 5 to the automatic cutter 7, thereby being cut. As shown in FIG. 4, the cutter 7 is rotated so as to contact movable blade 7' to cut the recording paper. In the moment of cutting, although the guiding element 6 is slightly pushed backwards together with the movable blade 7', the guiding surface 6' of the guiding element 6 does not impact the receiving roll 3 because the guiding element 6 is pivoted to the guiding element 5 for the guiding surface 6' to be supported by the underside of the guiding element 5 in a position sufficiently spaced from the receiving roll 3. Furthermore, the guiding element 5 is fixed closely adjacent to the receiving roll 3 so as to minimize the gap between the receiving roll 3 and the guiding element 5, thereby substantially obviating jams of the recording paper in the gap. The movable blade 7' is pushed back to the original position by spring 10.

Meanwhile, the contacting surface between the recording paper and the final guide 8 is considerably reduced due to the elongated ridges 8b, so that jams of the recording paper in the final guide 8 are considerably decreased or almost will not occur even under moisture on the elongated ridges when the recording paper passes the final guide 8.

The foregoing description shows only a preferred embodiment of the present invention. Various modifications are apparent to those skilled in the art without departing from the scope of the present invention which is only limited by the appended claims. Therefore, the embodiment shown and described is only illustrative, not restrictive.

Figure 3:
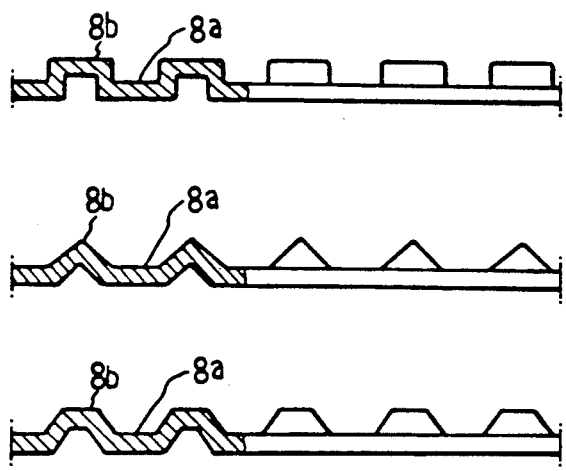
FIG. 3 is another embodiment of the inventive structure.

While the invention has been particularly shown and described with reference to a preferred embodiment , it will be understood by those skilled in the art that modifications in detail may be made without departing from the spirit and scope of the invention. For example, the cross section of the elongated ridges may be semi-circular, rectangular, triangular, or trapezoidal, which are well illustrated in FIG. 3.

What is claimed is:

1. A device for preventing jam of heat-sensitive recording paper for use in a facsimile system comprising:
    a heat-sensitive recording element for recording received data on heat-sensitive recording paper;
    a receiving roll mounted below said heat-sensitive recording element for conveying said heat-sensitive recording paper;

a first intermediate guiding unit adjacent said receiving roll for receiving and guiding said heat-sensitive recording paper from said receiving roll;

a second intermediate guiding unit having an "L" shape including a cutting blade mounted on one part of said "L" and another part of said "L" being pivotally mounted below said first intermediate guiding unit;

an automatic cutter for cutting said heat-sensitive paper guided by said first guiding unit over said cutting blade of said second guiding unit, wherein said automatic cutter rotatably contacts said cutting blade thereby pushing said one part of said "L" backward causing said another part of said "L" to rotate upward to contact said first intermediate guiding unit;

a spring mounted below said one part of said "L" for pushing said cutting blade to its original position after said automatic cutter no longer is in contact with said cutting blade; and a final guide having a plurality of elongated ridges formed on a surface thereof for receiving and guiding said heat-sensitive recording paper from said second intermediate guiding unit, said elongated ridges causing a contact surface area between said heat-sensitive recording paper and said final guide to be reduced.

2. The device as claimed in claim 1, wherein said elongated ridges of said final guide have a semi-circular cross section.

3. The device as claimed in claim 1, wherein said elongated ridges of said final guide have a rectangular cross section.

4. The device as claimed in claim 1, said elongated ridges of said final guide have a triangular cross section.

5. The device as claimed in claim 1, said elongated ridges of said final guide have a trapezoidal cross section.

* * * * *

UNITED STATES PATENT AND TRADEMARK OFFICE
CERTIFICATE OF CORRECTION

PATENT NO. : 5,115,322
DATED : May 19, 1992
INVENTOR(S) : Dug-Hwan JANG

It is certified that error appears in the above-indentified patent and that said Letters Patent is hereby corrected as shown below:

Column 1,

Line 52, after "connecting", change "on" to --one--:

Signed and Sealed this

Twenty-fifth Day of June, 1996

Attest:

BRUCE LEHMAN

*Attesting Officer*  *Commissioner of Patents and Trademarks*